United States Patent
Rayl et al.

(10) Patent No.: US 7,729,844 B2
(45) Date of Patent: Jun. 1, 2010

(54) HCCI COMBUSTION MODING STATE CONTROL FOR FUEL ECONOMY AND SEAMLESS TRANSITIONS

(75) Inventors: Allen B. Rayl, Waterford, MI (US); Chen-Fang Chang, Troy, MI (US); Peter Kafarnik, Eltville-Erbach (DE); Jun-Mo Kang, Ann Arbor, MI (US); Vijay Ramappan, Novi, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/360,336

(22) Filed: Jan. 27, 2009

(65) Prior Publication Data

US 2009/0234560 A1 Sep. 17, 2009

Related U.S. Application Data

(60) Provisional application No. 61/036,295, filed on Mar. 13, 2008.

(51) Int. Cl.
*F02B 17/00* (2006.01)
(52) U.S. Cl. .................. 701/103; 701/111; 123/295; 123/90.15
(58) Field of Classification Search .......... 701/103, 701/111; 123/295, 90.15–90.18
See application file for complete search history.

(56) References Cited

U.S. PATENT DOCUMENTS

| 7,258,104 | B2 * | 8/2007 | Young et al. ............. 123/432 |
| 7,540,270 | B2 * | 6/2009 | Kang et al. ............. 123/295 |
| 2006/0196466 | A1 * | 9/2006 | Kuo et al. ............. 123/295 |
| 2006/0196469 | A1 * | 9/2006 | Kuo et al. ............. 123/305 |
| 2006/0243241 | A1 * | 11/2006 | Kuo et al. ............. 123/295 |
| 2007/0157604 | A1 * | 7/2007 | Kakuya et al. ............. 60/285 |
| 2007/0157901 | A1 * | 7/2007 | Caine et al. ............. 123/302 |
| 2007/0272202 | A1 * | 11/2007 | Kuo et al. ............. 123/295 |
| 2007/0272203 | A1 * | 11/2007 | Sloane et al. ............. 123/295 |
| 2008/0066713 | A1 * | 3/2008 | Megli et al. ............. 123/295 |
| 2008/0281497 | A1 * | 11/2008 | Kumano et al. ............. 701/102 |
| 2009/0099751 | A1 * | 4/2009 | Kuzuyama ............. 701/102 |
| 2009/0229564 | A1 * | 9/2009 | Kang et al. ............. 123/295 |

* cited by examiner

*Primary Examiner*—Erick Solis
(74) *Attorney, Agent, or Firm*—Harness, Dickey & Pierce, P.L.C.

(57) ABSTRACT

A method and system for controlling an engine includes a spark ignition (SI) control module operating the engine in a spark ignition mode in a high lift valve state and a pre-HCCI control module entering a matching state when homogeneous charge compression ignition (HCCI) mode conditions are met. When a matching condition is met, the pre-HCCI control module enters a pre-homogeneous charge compression ignition mode and performs spark retardation, stratified operation or lean operation and commands a low lift valve state. The system also includes an HCCI control module entering an HCCI mode and when in the low lift valve state.

20 Claims, 5 Drawing Sheets

HCCI COMBUSTION MODING STATE CONTROL FOR FUEL ECONOMY AND SEAMLESS TRANSITIONS

CROSS-REFERENCE TO RELATED APPLICATIONS

This application claims the benefit of U.S. Provisional Application No. 61/036,295, filed on Mar. 13, 2008. The disclosure of the above application is incorporated herein by reference in its entirety.

FIELD OF THE INVENTION

The present invention relates to engine control systems, and more particularly to engine control systems for engines operating in both spark ignition and homogenous charge compression ignition (HCCI) modes.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines may be operated in a spark ignition (SI) mode and a homogeneous charge compression ignition (HCCI) mode. The HCCI mode involves compressing a mixture of fuel and an oxidizer to a point of auto-ignition. One of the modes may be selected based on engine speed and load. In the HCCI mode, ignition occurs at several locations at a time, which makes a fuel/air mixture burn nearly simultaneously. The HCCI mode performs close to an ideal Otto cycle, provides improved operating efficiency and generates lower emission levels as compared to SI mode. However since there is no direct initiator of combustion, the ignition process tends to be more difficult to control.

To adjust operation during the HCCI mode, a control system may alter the conditions that induce combustion. For example, the control system may adjust compression ratios, induced gas temperature, induced gas pressure, or the quantity of retained or reinducted exhaust. Several approaches have been used to perform the adjustments and thus extend the HCCI operating region.

One control approach employs variable valve timing to adjust the compression ratio. For example, the compression ratio can be controlled by adjusting when intake valves close. The amount of exhaust gas retained in a combustion chamber can be controlled by valve re-opening and/or valve overlap.

Another approach uses a "2-step" intake valve lift approach, which includes switching intake valve modes between a HIGH lift state and a LOW lift state. During the HIGH lift state, the intake valves are lifted to a HIGH level to allow for an amount of air to enter the corresponding cylinders. During the LOW lift state, the intake valves are lifted to a LOW level with a shorter duration, which allows a smaller amount of air to enter the corresponding cylinders relative to the HIGH lift state.

Without compensation, the 2-step valve lift approach tends to have abrupt and non-uniform transitions between SI and HCCI modes. In other words, there may be undesirable torque disturbances during the transitions.

SUMMARY

The engine control system according to the present disclosure operates the gasoline engine in the SI mode and the HCCI mode. The HCCI mode reduces fuel consumption but is only available over a limited range of engine torques and speeds.

In one aspect of the disclosure, a method includes operating the engine in a spark ignition (SI) mode in a high lift valve state, when homogeneous charge compression ignition (HCCI) mode conditions are met, entering a matching state, when a matching condition is met, entering a pre-homogeneous charge compression ignition mode and performing spark retardation, stratified operation or lean operation in a high lift valve state, when in the high lift valve state and in the pre-HCCI mode, commanding an HCCI low lift valve state with stratified operation or lean operation and thereafter, entering the low lift valve state and the HCCI mode.

In another aspect of the disclosure, a system for controlling an engine includes a spark ignition (SI) control module operating the engine in a spark ignition mode in a high lift valve state and a pre-HCCI control module entering a matching state when homogeneous charge compression ignition (HCCI) mode conditions are met. When a matching condition is met, the pre-HCCI control module enters a pre-homogeneous charge compression ignition mode and performs spark retardation, stratified operation or lean operation and commands a low lift valve state. The system also includes an HCCI control module entering an HCCI mode in the low lift valve state.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein.

DETAILED DESCRIPTION

Figure 1A:
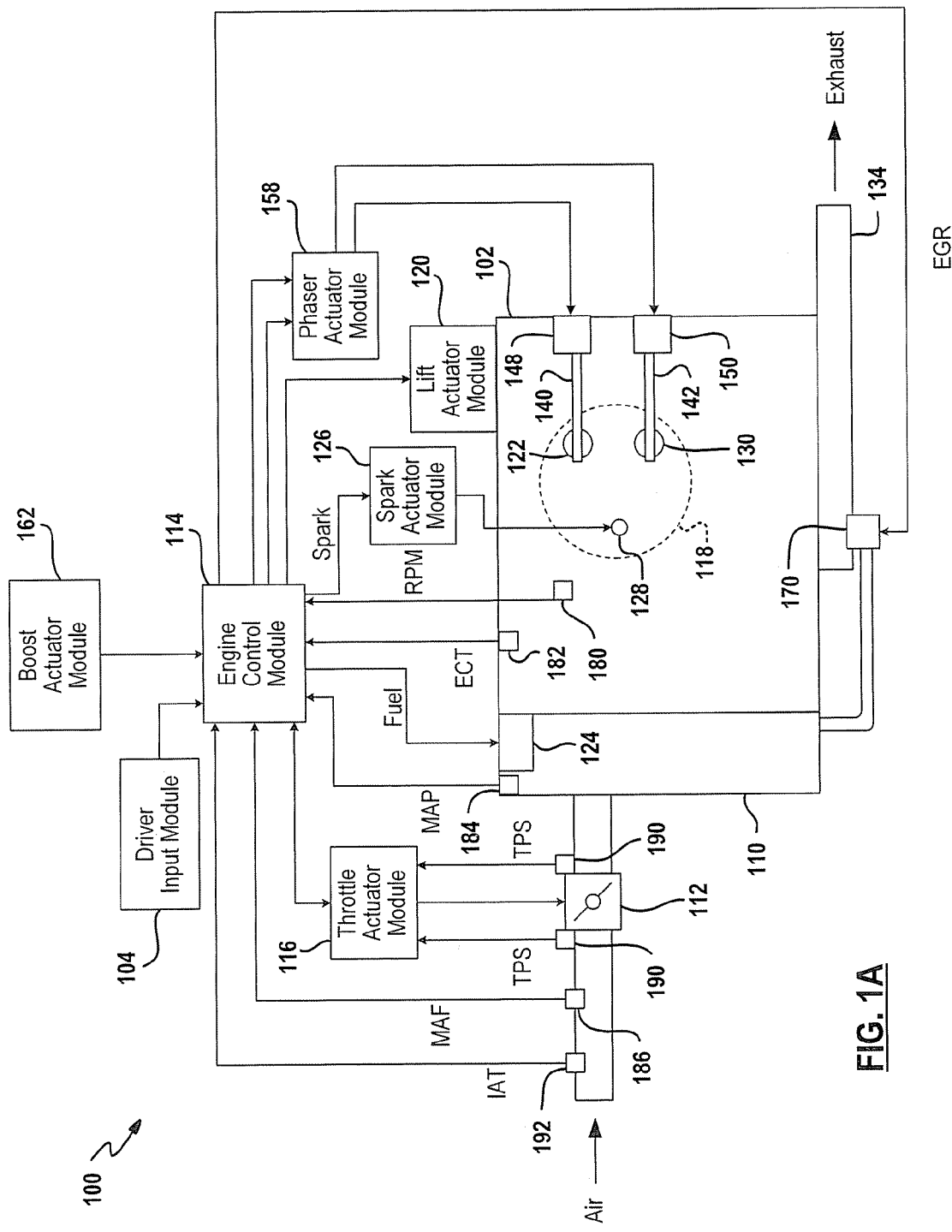
FIG. 1A is a functional block diagram of an engine control system that operates in SI and HCCI combustion modes according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The engine control system according to the present disclosure operates the gasoline engine in the SI mode and the HCCI mode. The HCCI mode reduces fuel consumption but is only available over a limited range of engine torques and speeds. For example only, the engine control system may operate the engine in the HCCI mode at low to mid loads and low to mid engine speeds. The engine control system may operate the engine in the SI mode at other loads and engine speeds. The HCCI operating zones may be defined by operating maps in calibration tables.

The engine may be a direct injection gasoline engine and may be selectively operated in a stratified operating mode during the transitions. To operate in the stratified operating mode, the fuel injectors inject the fuel into an area of the cylinder, often a small "sub-cylinder" at the top, or periphery, of the main cylinder. This approach provides a rich charge in that area that ignites easily and burns quickly and smoothly. The combustion process proceeds to a very lean area (often only air) where the flame-front cools rapidly and nitrogen oxides ($NO_x$) have little opportunity to form. The additional oxygen in the lean charge also combines with carbon monoxide (CO) to form carbon dioxide ($CO_2$).

Transitions between the SI mode and the HCCI mode should appear seamless to the driver, minimize engine emissions and minimize fuel consumption losses.

During HCCI operation, the intake manifold pressure may be near atmospheric pressure. Transitions into and out of HCCI involve changes to intake manifold pressure and valve lift. These changes tend to cause sudden changes in air charge supplied to the cylinders. As a result, undesirable changes in engine torque will occur if not properly managed.

The present disclosure sets forth three alternative combustion mode state flow control systems and methods to maximize time in HCCI combustion, minimize losses during transitions, and minimize torque disturbances during transitions.

A first control system and method (HCCI Transition State Flow—With Volume Matching Entry & Exit Transitions) involves volume matching to control air charge with manifold absolute pressure (MAP) and cam phasers during transitions. Use of torque smoothing via spark retard or lean operation is minimized.

A second control system and method (HCCI Transition State Flow—Volume Matching Entry with Fast Exit) uses volume matching for entry into HCCI and fast, synchronized transitions are used for exit from HCCI. Torque is smoothed with spark retard and or lean operation. This approach will provide faster transitions back to SI combustion, but may tend to be less efficient than the first control system and method.

A third control system and method (HCCI Transition State Flow—Fast Transitions, w/o Volume Matching). The transitions are based on fast throttle and cam phasing, using spark retard and/or lean operation. The third control system and method tends to be less efficient than the first or second control systems and methods, but tends to provide faster transitions.

For all transitions, a pre-HCCI state may be used to coordinate switching to low lift cam profiles and coordinate the transition into HCCI.

Referring now to FIG. 1A, a functional block diagram of an exemplary engine system 100 is presented. The engine system 100 includes an engine 102 that combusts an air/fuel mixture to produce drive torque for a vehicle based on a driver input module 104. The engine may be a direct ignition engine. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. The lift actuator module 120 adjust the amount of valve lift hydraulically or using other methods.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The ECM 114 may calculate measured air per cylinder (APC) based on the MAF signal generated by the MAF sensor 186. The ECM 114 may estimate desired APC based on engine operating conditions, operator input or other parameters. The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance or retard. Other actuators include the EGR valve 170, the phaser actuator module 158, and the fuel injection system 124. The term actuator position with respect to these actuators may correspond to, EGR valve opening, intake and exhaust cam phaser angles, air/fuel ratio, respectively.

Figure 1B:
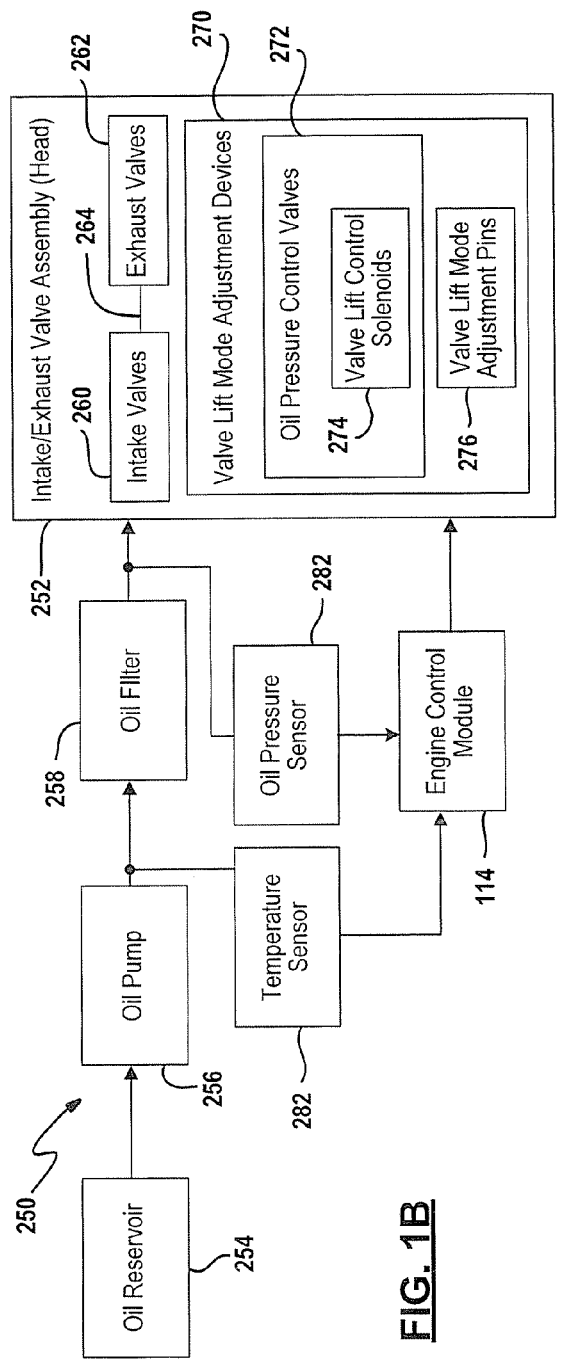
FIG. 1B is a functional block diagram of an exemplary valve lift adjustment system.

Referring now to FIG. 1B, a functional block diagram of a valve lift control circuit 250 is shown. The valve lift control circuit 250 includes an intake/exhaust valve assembly 252 that receives oil from an oil reservoir 254 via an oil pump 256. The oil is filtered through an oil filter 258 prior to reception by the valve assembly 252. The control module controls lift operation of intake and exhaust valves 260, 262 of the valve assembly 252.

The valve assembly 252 includes the intake and exhaust valves 260, 262, which have open and closed states and are actuated via one or more camshafts 264. A dedicated intake camshaft and a dedicated exhaust camshaft may be included. In another embodiment, the intake and exhaust valves 260, 262 share a common camshaft. When in an open state the intake and exhaust valves 260, 262 may be operating in various lift states.

The valve assembly 252 also includes valve lift state adjustment devices 270. The lift state adjustment devices 270 may include oil pressure control valves 272 and valve lift control valves, such as solenoids 274. Other lift state adjustment devices 276, such as lift pins, levers, rockers, springs, locking mechanisms, tappets, etc may be included.

The valve lift control circuit 250 may include an oil temperature sensor 280 and/or an oil pressure sensor 282. The control module signals the oil pressure control valves 272 based on temperature and pressure signals received from the temperature and pressure sensors 280, 282.

Figure 1C:
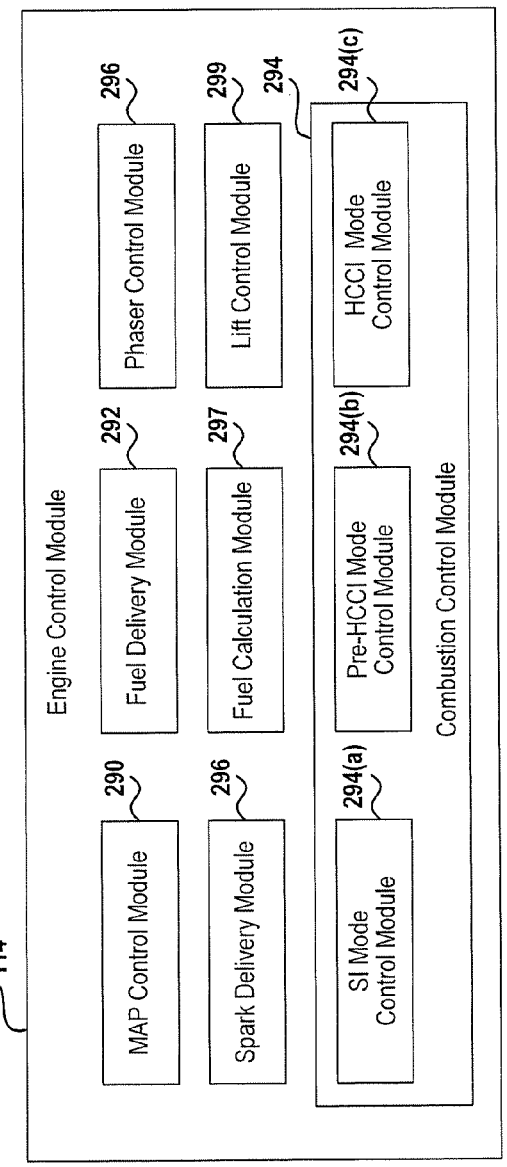
FIG. 1C is a functional block diagram of an exemplary engine control module.

Referring now to FIG. 1C, the engine control module 114 may comprise a map control module 290 having a MAP control mode (MM). The MM can be set to SI and HCCI modes. The engine control module 114 comprises a fuel delivery module 292 having a fuel delivery mode (FM). The fuel delivery module 292 may switch the FM between SI, stratified and HCCI modes. The fuel delivery module 292 may determine the manner, timing and/or amount of fuel delivery.

The engine control module 114 comprises a combustion control module 294 having a combustion mode (CM). The combustion module 294 may switch the CM between SI, HCCI and pre-HCCI modes and include an SI control module 294(a), a pre HCCI control module 294(b) and an HCCI control module 294(c).

The engine control module 114 comprises a spark delivery module 296 having a spark delivery mode (SM). The spark delivery module 296 may switch the SM between SI, SI with retard, stratified and HCCI modes. The spark delivery module 296 may determine the timing and duration of spark.

The engine control module 114 comprises a fuel calculation module 297 having a fuel calculation mode (FC). The fuel calculation module 297 may switch the FC between air lead and fuel lead modes. In air lead mode, fuel is controlled based on air. In fuel lead mode, air is controlled based on the measured or delivered fuel.

The engine control module 114 comprises a phaser control module 298 having a phaser control mode (PM). The phaser control module 298 may switch the PM between SI and HCCI modes. The phaser control module 298 may determine cam phasing.

The engine control module 144 comprises a lift control module 299 having a lift control mode (LM). The lift control module 299 may switch the LM between high and low valve lift modes.

Figure 2:
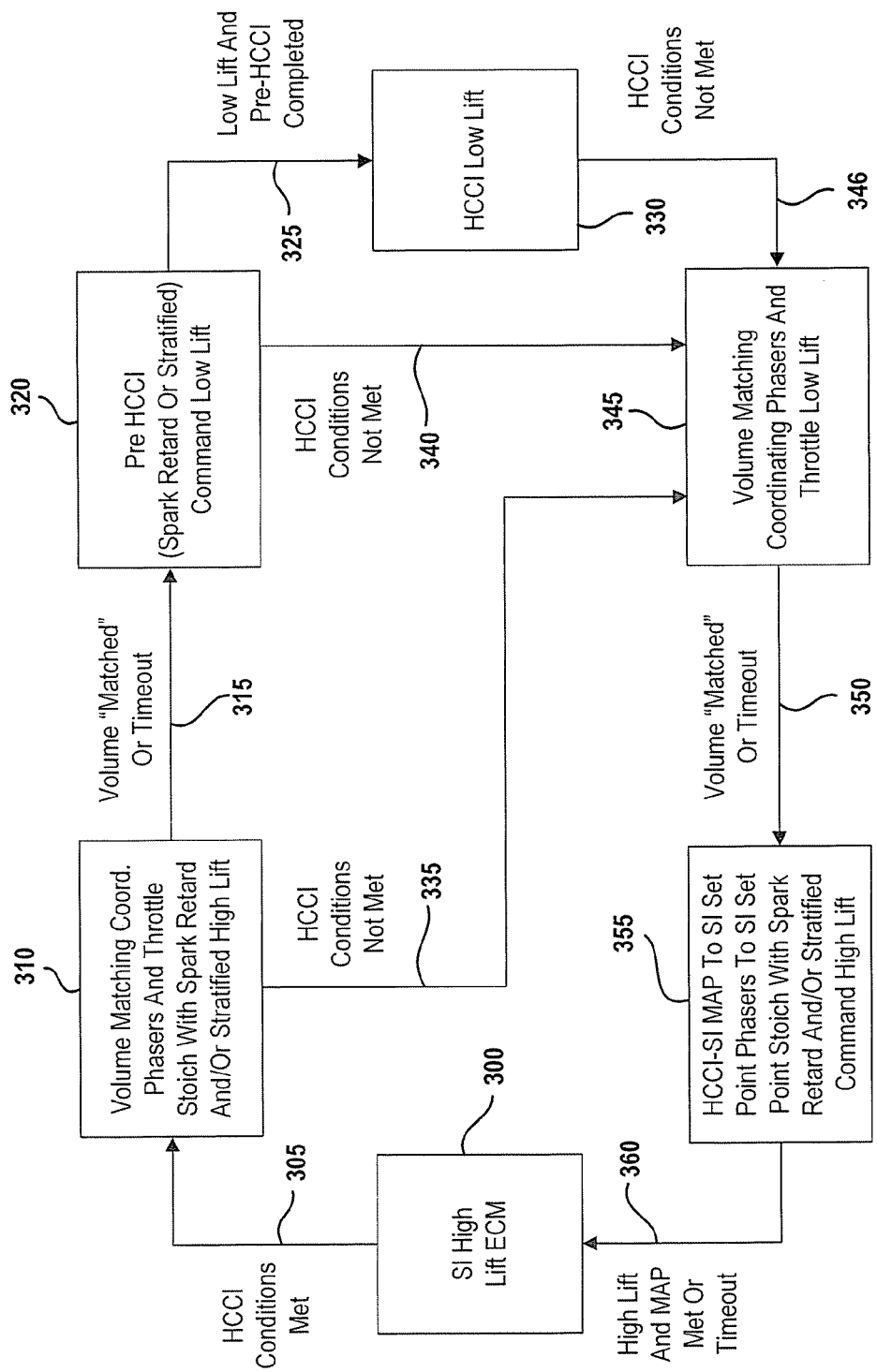
FIG. 2 is an HCCI state flow diagram depicting a first control system and method with volume matching entry and exit transitions.

Referring now to FIG. 2, a first control system and method (HCCI Transition State Flow—With Volume Matching Entry & Exit Transitions) involves volume matching to control air charge with MAP and cam phasers during both SI to HCCI and HCCI to SI transitions. Use of torque smoothing via spark retard and/or lean operation is minimized.

Control begins in state 300 where the engine operates in the SI mode with the intake and/or exhaust valves in the high lift state. When HCCI conditions are met (condition 305), control transitions to state 310. In state 310, volume matching with a predetermined volume for entering HCCI mode, and coordinated phasers and throttle may be used for torque smoothing. The predetermined volume corresponds to an amount of air allowed to be drawn into the cylinder through the valve opening. The volume may change and depends on the characteristics of the engine. Stoichiometry with spark retard and/or stratified operation may also be performed for torque smoothing. The intake and/or exhaust valves are in the high lift state.

If volume is matched to the predetermined volume or a predetermined time out occurs (condition 315), control transitions to state 320. In state 320, the engine is in a pre-HCCI mode. Spark retard and/or stratified operation may be used. The intake and/or exhaust valves are commanded to the low lift state.

When low lift is achieved and pre-HCCI conditions are complete (condition 325), control transitions to state 330. In state 330, the engine operates in the HCCI mode with intake and/or exhaust valves in the low lift state. Control may also transition from states 310, 320 and 330 to state 345 when conditions 335, 340 and 346 are met, respectively. Conditions 335, 340 and 346 correspond to HCCI conditions not being met.

In state 345, control uses volume matching to match a predetermined volume corresponding to leaving HCCI mode, coordinated phasers and throttle to smooth the torque. The intake and/or exhaust valves are in the low lift state. If volume is matched or a predetermined timeout occurs (condition 350), control transitions to state 355. In state 355, control transitions from HCCI to SI, MAP and phasers are adjusted to the SI setpoint, stoichiometry with spark retard and/or stratified operation may be employed. In addition, the intake and/or exhaust valves are commanded to the high lift state. Control transitions from state 355 to state 300 when the valves are in the high lift state and MAP is met or a predetermined timeout occurs (condition 360).

Figure 3:
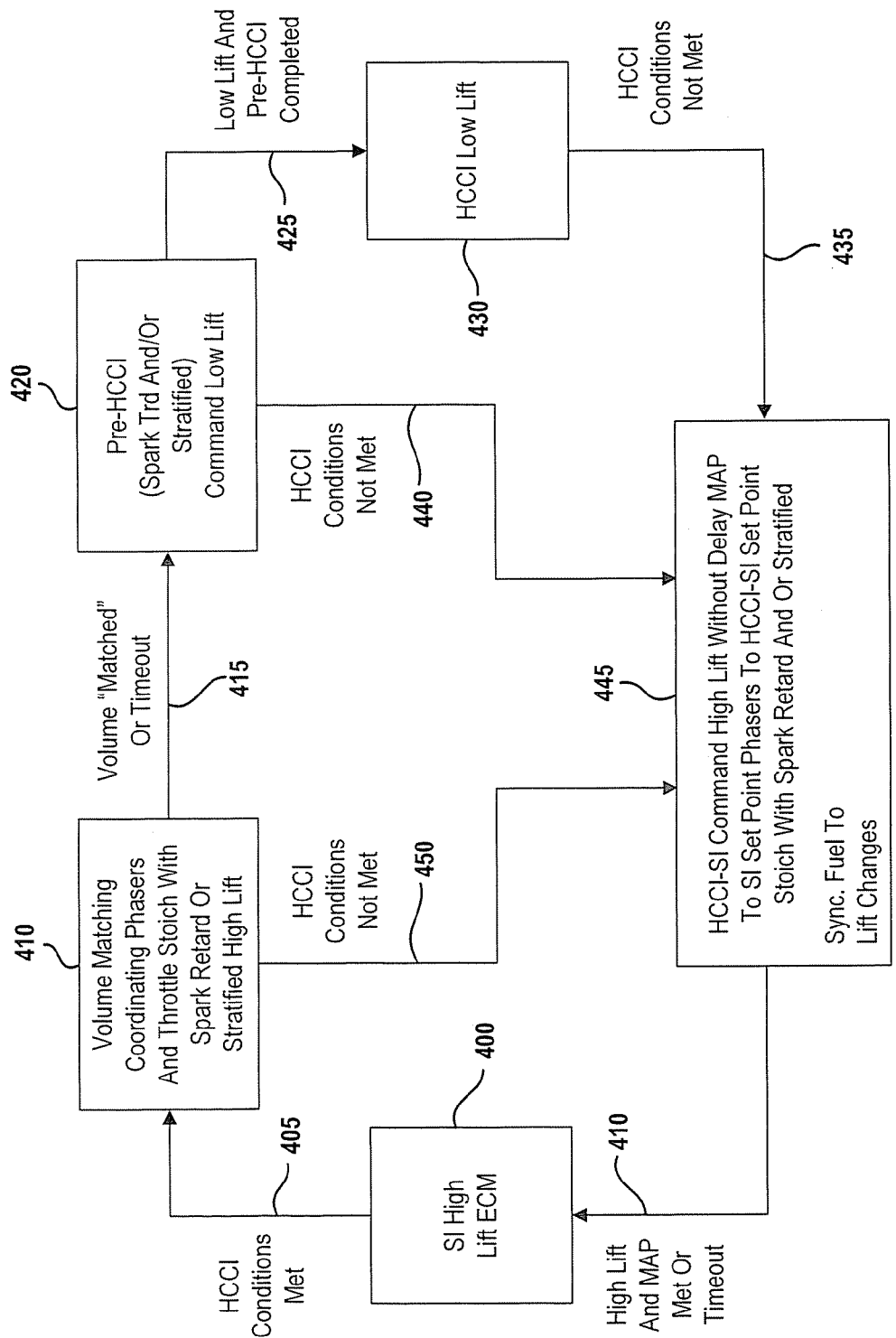
FIG. 3 is an HCCI state flow diagram depicting a second control system and method with volume matching entry with fast exit.

Referring now to FIG. 3, a second control system and method (HCCI Transition State Flow—Volume Matching Entry with Fast Exit) uses volume matching for entry into HCCI and fast, synchronized transitions are used for exit from HCCI. Torque may be smoothed with spark retard and/or lean operation. This approach benefits from faster HCCI to SI transitions and may tend to be less efficient than the first control system and method.

Control begins with state 400 where the engine is operated in SI mode with the intake and/or exhaust valves in the high lift state. When HCCI conditions are met (condition 405), control transitions to state 410. In state 410, volume matching, coordinated phasers and throttle, stoichiometry with spark retard and/or stratified operation may be performed. Intake and/or exhaust valves are in the high lift state. When volume is matched or a predetermined timeout occurs (condition 415), control transitions to state 420. In state 420, the -Pre-HCCI mode is selected. Spark retard and/or stratified operation may be used. The intake and/or exhaust valves are commanded to the low lift state.

When low lift state is achieved and pre-HCCI is completed (condition 425), control transitions to state 430. In state 430, the engine operates in HCCI mode with the intake and/or exhaust valves in the low lift state. Control may also transition from states 410, 420 and 430 to state 445 when conditions 450, 440 and 435 are met, respectively. Conditions 450, 440 and 435 correspond to HCCI conditions not being met.

In state 445, control transitions from HCCI to SI, commands the high lift state without delay, sets MAP to the SI setpoint, phasers to a HCCI-SI setpoint and/or may employ stoichiometry with spark retard and/or stratified operation. When the high lift state and MAP is met, or high lift state and a predetermined timeout occurs (condition 410), control continues with state 400.

Figure 4:
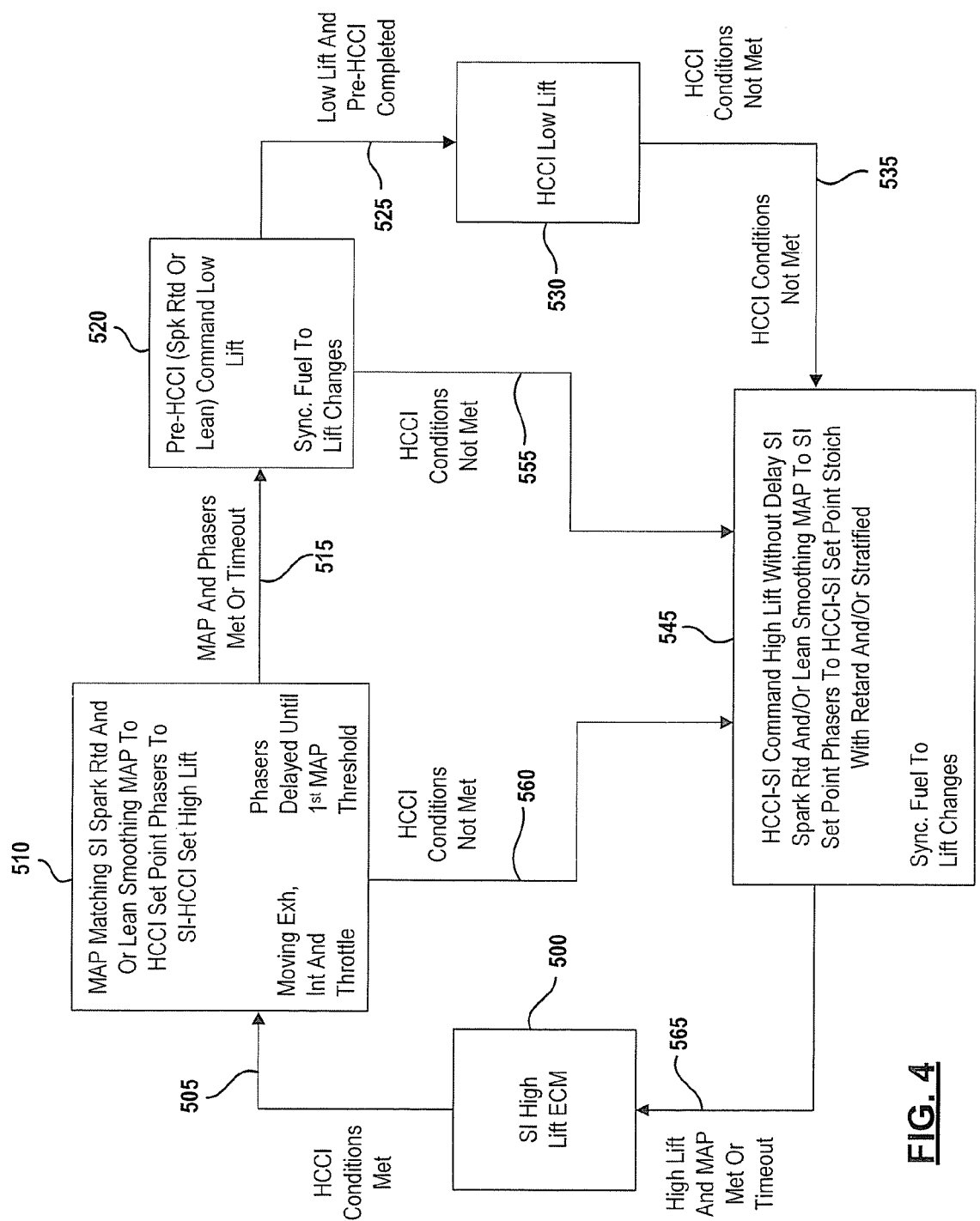
FIG. 4 is an HCCI state flow diagram depicting a third control system and method with fast transitions without volume matching.

Referring now to FIG. 4, a third control system and method (HCCI Transition State Flow—Fast Transitions, w/o Volume Matching). The transitions are based on fast throttle and cam phasing, using spark retard and/or lean operation. The third control system and method tends to be less efficient than the first or second control systems and methods, but tends to provide faster transitions.

Control begins in state 500 where the engine operates in the SI mode with the intake and/or exhaust valves in the high lift state. When HCCI conditions are met (condition 505), control transitions to state 510. In state 510, MAP matching is performed, spark is based on SI with retard and/or lean smoothing is performed. MAP is set to the HCCI setpoint and phasers are set to the SI-HCCI setpoint. The setpoints are determined experimentally during engine calibrations. The intake and/or exhaust valves remain in the high lift state.

When MAP and phaser setpoints are met or a predetermined timeout occurs (condition 515), control continues with state 520. In state 520, the engine is in the pre-HCCI mode. Spark retard or lean smoothing may be employed. The intake and/or exhaust valves are commanded to the low lift state. When the low lift state and pre-HCCI are completed (condition 525), control transitions to state 530. In state 530, the engine is operated in the HCCI mode and the intake and/or exhaust valves are in the low lift state. Control may also transition from states 510, 520 and 530 to state 545 when conditions 560, 555 and 535 are met, respectively. Conditions 560, 555 and 535 correspond to HCCI conditions not being met.

In state 545, control transitions from HCCI to SI. The intake and/or exhaust valves are commanded to the high lift state without delay. SI with spark retard and/or lean smoothing may be employed. MAP is set to the SI setpoint. Phasers are set to the HCCI-SI setpoint. Stoichiometry with retard and/or stratified operation may be employed. When the high lift state and MAP are met, or high lift state and a predetermined timeout occurs (condition 565), control transitions to state 500.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of controlling an engine comprising:
   operating the engine in a spark ignition (SI) mode in a high lift valve state;
   when homogeneous charge compression ignition (HCCI) mode conditions are met, entering a matching state;
   when a matching condition is met, entering a pre-homogeneous charge compression ignition mode and performing spark retardation, stratified operation or lean operation in the high lift valve state;
   when in the high lift valve state and in a pre-HCCI mode, commanding a low lift valve state; and
   thereafter, entering the low lift valve state and the HCCI mode.

2. A method as recited in claim 1 wherein entering a matching state comprises entering a volume matching state and wherein the matching condition is volume.

3. A method as recited in claim 2 wherein entering a volume matching state comprises torque smoothing by coordinating cam phasers and throttle and reaching stoichiometry with spark retardation or stratified operation.

4. A method as recited in claim 2 wherein entering a volume matching state comprises torque smoothing by coordinating cam phasers and throttle and reaching stoichiometry with spark retardation or stratified operation while maintaining a high lift valve state.

5. A method as recited in claim 1 wherein entering a matching state comprises commanding a manifold absolute pressure matching state and wherein the matching condition is manifold absolute pressure.

6. A method as recited in claim 5 wherein commanding a manifold absolute pressure matching state comprises torque smoothing by controlling spark based on Si with retardation or lean smoothing, controlling the manifold absolute pressure to the HCCI setpoint and controlling phasers to an SI-HCCI setpoint.

7. A method as recited in claim 5 wherein commanding a manifold absolute pressure matching state comprises torque smoothing by controlling spark based on SI with retardation or lean smoothing, controlling the manifold absolute pressure to the HCCI setpoint and controlling phasers to an SI-HCCI setpoint while maintaining a high lift valve state.

8. A method as recited in claim 1 further comprising when HCCI conditions are not met, torque smoothing using volume matching and coordinating the cam phasers and throttle in a low lift valve condition.

9. A method as recited in claim 1 further comprising when HCCI conditions are not met, commanding a high lift valve state without delay.

10. A method as recited in claim 9 further comprising when HCCI conditions are not met, controlling the manifold absolute pressure to an SI set point, controlling the cam phasers to an HCCI-SI set point, an controlling stoichiometry with spark retardation or stratification or both.

11. A method as recited in claim 10 further comprising when HCCI conditions are not met, controlling the spark to an SI spark retardation or lean smoothing.

12. A method as recited in claim 10 when the high lift state is achieved and the MAP is met, entering a high lift valve state and SI mode.

13. A system for controlling an engine comprising:
a spark ignition (SI) control module operating the engine in a spark ignition mode in a high lift valve state;
a pre-homogeneous charge compression ignition (HCCI) control module entering a matching state when HCCI mode conditions are met, when a matching condition is met, entering a pre-homogeneous charge compression ignition mode and performing spark retardation, stratified operation or lean operation and commanding a low lift valve state;
an HCCI control module entering an HCCI mode and when in the low lift valve state.

14. A system as recited in claim 13 wherein the matching state comprises a volume matching state.

15. A system as recited in claim 13 wherein the pre-HCCI control module torque smoothes by coordinating cam phasers and throttle and reaching stoichiometry with spark retardation or stratified operation while maintaining a high lift valve state.

16. A system as recited in claim 13 wherein the matching state comprises a manifold absolute pressure matching state.

17. A system as recited in claim 16 wherein pre-HCCI control module torque smoothes by controlling spark based on SI with retardation or lean smoothing, controlling the manifold absolute pressure to an HCCI set point and controlling phasers to an SI-HCCI set point.

18. A system as recited in claim 16 wherein pre-HCCI control module torque smoothes by controlling spark based on SI with retard or lean smoothing, controlling the manifold absolute pressure to an HCCI set point and controlling phasers to an SI-HCCI set point while maintaining a high lift valve state.

19. A system as recited in claim 13 wherein the HCCI control module commands torque smoothing using volume matching and coordinating cam phasers and throttle in a low lift valve condition when HCCI conditions are not met.

20. A system as recited in claim 13 wherein the HCCI control module commands a high lift valve state without delay when HCCI conditions are not met.

* * * * *